April 26, 1938.   H. A. DOUGLAS   2,115,010
CONNECTING MEANS
Original Filed Jan. 18, 1933    3 Sheets—Sheet 1

Inventor
Harry A. Douglas
By: Langdon Moore
Atty.

April 26, 1938. H. A. DOUGLAS 2,115,010
CONNECTING MEANS
Original Filed Jan. 18, 1933 3 Sheets-Sheet 2

Inventor
Harry A. Douglas
By: Langdon Moore Atty.

April 26, 1938. H. A. DOUGLAS 2,115,010
CONNECTING MEANS
Original Filed Jan. 18, 1933 3 Sheets-Sheet 3
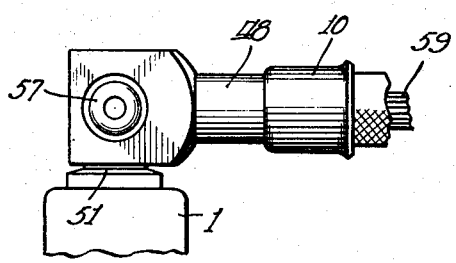
Fig. 13
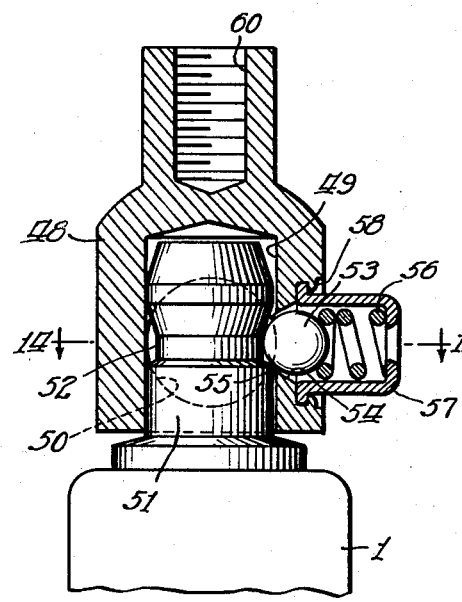
Fig. 12
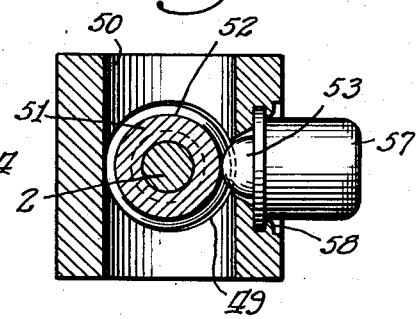
Fig. 14
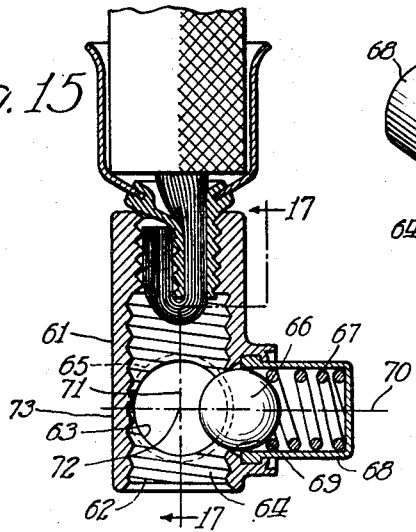
Fig. 15
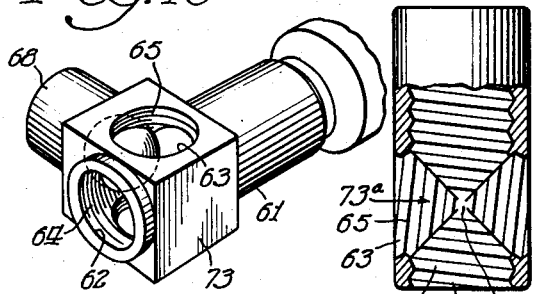
Fig. 16
Fig. 17
Inventor
Harry A. Douglas
By: Langdon Moore
Atty.

Patented Apr. 26, 1938

2,115,010

UNITED STATES PATENT OFFICE 2,115,010

CONNECTING MEANS

Harry A. Douglas, Bronson, Mich., assignor to Kingston Products Corporation, a corporation of Indiana Application January 18, 1933, Serial No. 652,290
Renewed July 22, 1935

6 Claims. (Cl. 173—269)

This invention relates to connecting means, more particularly for electrical conductors, and the principal object of my invention is to provide new and improved connecting means of this type.

Another object of the invention is to provide an improved and economical form of snap terminal connecting means which may be applied to the ordinary screw-threaded stud of an internal combustion engine spark-plug, for example, by a simple rectilinear movement either axially of the connecting means or transversely thereof. Other objects will appear hereinafter as the description of the invention proceeds.

The present invention is in some respects an improvement upon the invention of my co-pending application, Serial No. 637,719, filed October 12, 1932, and subject-matter not claimed herein is claimed in that application.

The invention will be understood by reference to the illustrative constructions shown in the accompanying drawings, in which—

Figure 12 is a view similar to Figures 1, 5, 8 and 10, showing a further modification;

Figure 13 is a view, on a smaller scale, showing the structure of Figure 12 in alternative position;

Figure 14 is a section taken on the line 14—14 of Figure 12;

Figure 15 is an axial section similar to Figures 1 and 12 showing a further modified form;

Figure 16 is a perspective view of the modification of Figure 15; and

Figure 17 is a section taken on the line 17—17 of Figure 15.

Figure 1:
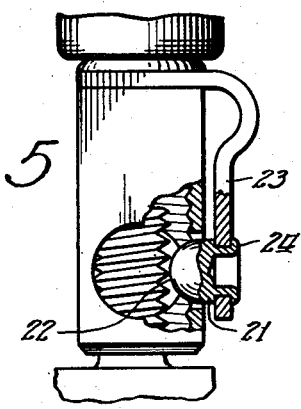
Figure 1 is an axial section of connecting means embodying my invention, parts associated therewith being shown in elevation.

In the illustrative construction, I have shown a conventional spark-plug such as is commonly used in internal combustion engines and having the usual central electrode terminating at the top of the plug in a threaded stud 2 to which, in accordance with customary practice, is connected the high tension lead of the electric ignition system, by means of a nut (not shown) screwed upon the stud 2. In certain motor block constructions, for example, where the spark-plug is received in rather a deep pocket in the motor block, it is frequently difficult to attach the lead to the stud 2 by ordinary connecting means in which the lead approaches the stud in a transverse direction. In accordance with my invention, I have provided improved connecting means by which without the addition of any parts to the spark-plug, the lead may be connected thereto by the simple rectilinear movement of a snap terminal either axially, as shown in Figure 1, or transversely as shown in Figure 3.

For this purpose I have shown a hollow metallic jack 3 to which the lead wire 4 is axially connected. In this instance, the end of the wire 4 is bared of its insulation 5 and is passed through an exteriorly threaded sleeve 6 and folded back as at 7 upon the exterior of this sleeve. The sleeve 7 is then threadedly received in the interiorly threaded socket 8 in the base of the jack 3, the wire thus being securely clamped between the threads of the parts 6 and 8 affording a good mechanical and electrical connection between the wire and the jack. To provide room for the bent over portion 7 of the wire, the sleeve 6 in the region of this portion of the wire, may be longitudinally grooved as at 9, in accordance with my Patent No. 1,339,694, issued May 11, 1920. The sleeve 6 is desirably enlarged as at 10 to receive a portion of the insulation 5 and the jack 3 when screwed upon the sleeve portion 6 desirably abuts the enlargement 10.

In accordance with my present invention the jack 3 has a plurality of transversely related bores therein, one of said bores, such as the bore 11, being coaxial with the jack and the other, the bore 12, being transverse thereto. In this instance these bores desirably intersect perpendicularly and are served by a single spring pressed detent 13. As shown in Figures 1 to 4, inclusive, the detent 13 may be formed upon the free end of a leaf spring 14 riveted at its base 15 to the base of the jack as by the rivet flange 16, the leaf spring thus providing a spring arm which extends along the exterior of the jack, normally spaced therefrom, and having its free end turned at right angles thereto to project through the detent aperture 17 in the jack in the form of the integral detent 13. The aperture 17 intersects both the bores 11 and 12. The spring arm 14 may be bowed, as at 14a, to enhance its spring effect.

Figure 2:
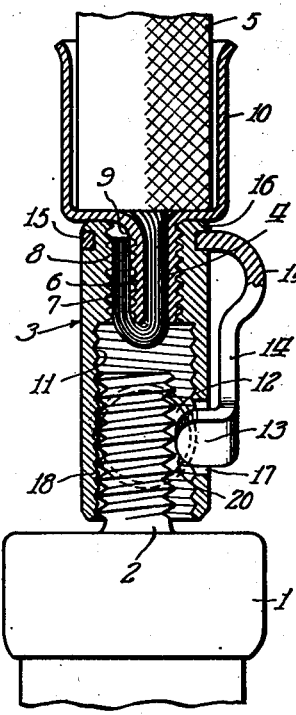
Figure 2 is an elevational view of the connector shown in Figure 1.
Figure 3:
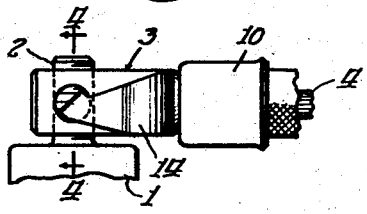
Figure 3 is an elevational view on a smaller scale showing the connecting means of Figure 1 in use in transverse position.
Figure 4:
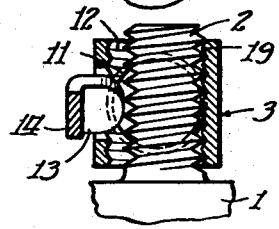
Figure 4 is a section taken on the line 4—4 of Figure 3.

The jack 3 is thus adapted to receive the member to be connected thereto, represented in Figures 1 to 11, inclusive, by the stud 2 of the sparkplug 1, within either the axial bore 11 of the jack or the transverse bore 12, so that the lead 14 may be connected thereto either axially, as shown in Figure 1, or transversely as shown in Figures 3 and 4. At the same time, the detent 13 is in position to yieldingly engage the stud regardless of which of the bores receives the stud. It will be noted that the bore 12 extends all the way through the jack, so that the stud may be inserted therein from either end as described.

To make possible a connection of the jack directly to the stud 2 and to enhance the security of this connection, I roughen the walls of the bores 11 and 12 which may be economically and advantageously accomplished by screw-threading them as indicated by the screw threads 18 of the bore 11 and 19 of the bore 12. The screw threads 18 and 19 are desirably of the same pitch as the conventional pitch for the screw threads of the stud 2, but are of less height, so that the threads of the stud 2 may slide over the threads 18 or 19 as the case may be, but be pressed into intimate intercalation therewith by the spring detent 13. This latter arrangement is more fully described and claimed in my co-pending application, Serial No. 637,719, filed October 12, 1932.

Figure 5:
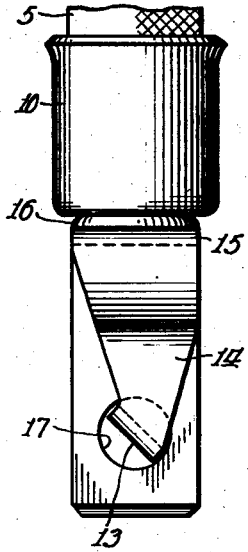
Figure 5 is an elevational view of connecting means embodying the invention in axial position, parts being broken away to show a modified form of spring detent.
Figure 6:
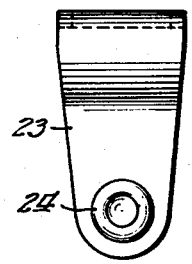
Figure 6 is an end view, in separated relation, of the spring detent shown in Figure 5.
Figure 7:
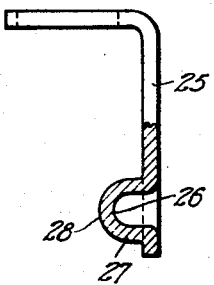
Figure 7 is an end view of a further modified form of detent partly in section.

The detent 13 desirably has an arcuate tip 20 to slide resiliently over the threads of the stud 2 and while this tip is shown flat in this instance, I advantageously dispose it diagonally to both of the bores 11 and 12 as best shown in Figures 2 and 3, so that its edges will not undesirably catch in the threads of the stud 2. As shown in Figure 5, however, this same result may be accomplished by providing a detent 21 having a dome-shaped tip 22 and secured to the spring arm 23 as by being riveted thereto at 24, or, as shown in Figure 7 a spring arm 25 may be circularly depressed as at 26 to provide an integral detent 27 also having a dome-shaped tip 28.

Figure 8:
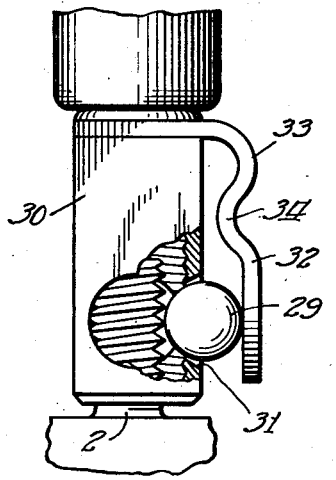
Figure 8 is a view similar to Figure 5, but showing a further modified form of spring detent.
Figure 9:
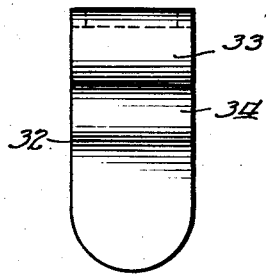
Figure 9 is an end view of the spring arm of Figure 8 in separated relation.

As shown in Figure 8, I may combine a ball bearing effect with the detent by providing a detent in the form of a separable steel ball 29, the detent aperture in the jack 30 in such instance being provided with a tapered annular seat 31 upon which the ball is pressed by the spring arm 32. The seat 31 permits a portion of the ball to be projected therepast into the bores of the jack to yieldingly engage the stud 2. The spring arm 32 may be oppositely bowed as at 33 and 34 to enhance its spring effect.

Figure 10:
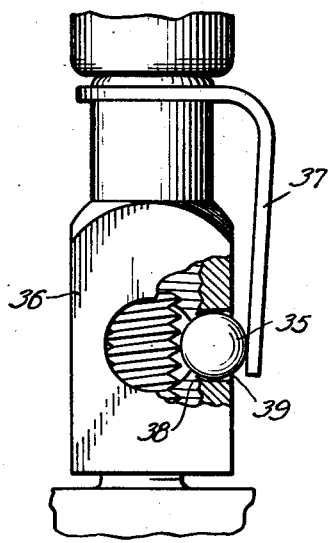
Figure 10 is a view similar to Figure 9 showing a further modified form of detent.

As shown in Figure 10, the ball detent 35 may be slightly smaller than the ball 29 and to compensate therefor may be projected farther into the jack 36 by the spring arm 37 which, in this instance, may be unbowed, but may be angularly directed upon the ball 35 to enhance its spring arm effect. In this case the seat for the ball 35 may be formed by upsetting as at 38 the inner margins of the detent aperture 39.

Figure 11:
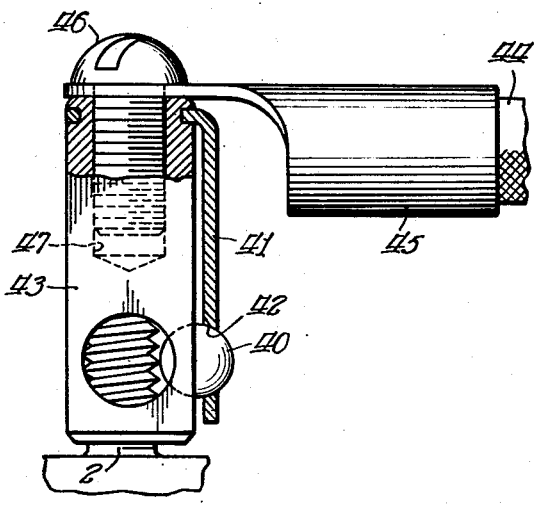
Figure 11 is a view similar to Figure 10 showing a still further modified form, together with a modified form of connection for the current conducting wire associated with my improved connecting means.

As shown in Figure 11 security of engagement of the ball detent 40 with the spring arm 41 may be enhanced by providing a complementary seat 42 in the arm 41 for the reception of the ball 40. As here shown, this seat may be formed by forming a hole in the arm 41 of less diameter than the ball 40 and by slightly tapering the margins of this hole. Should it be desired under certain circumstances to cause the jack 43 and stud 2 to be connected axially but to have the lead 44 connected transversely to the jack, the lead may be appropriately secured to a metallic lug 45 which may be secured to the base of the jack 43 by a screw 46 received in the threaded socket 47 in the jack.

As shown in Figure 12, the jack 48 may have its intersecting transversely related bores 49 and 50 unroughened and the stud 2 of the sparkplug 1 may have screwed thereon a conventional metallic terminal 51 provided with an annular groove 52 into which the ball detent 53 snaps. In this instance, the ball detent 53 has an annular seat 54 which permits a portion of the ball 53 to be projected through the aperture 55 into the bores 49 and 50, and the ball is urged toward its seat by a coil spring 56 carried by the jack through the intermediation of a short spring barrel 57 which has its open end riveted about the seat 54 as at 58.

Figure 13 shows the terminal 51 connected transversely with the jack as by being received in the bore 50.

In Figures 12, 13 and 14, the lead wire 59 may be connected to the jack as by being received in a threaded socket 60 in the jack 48, similarly to the construction shown in Figure 1.

In Figures 15 and 16, I have shown a jack 61 which may have the perpendicularly intersecting bores 62 and 63 therein which bores have the internal transverse screw threads 64 and 65 cut therein. The jack 61 is adapted to receive the threaded stud 2 therein, the bores 62 and 63 being of the same diameter and of a diameter relatively larger than the over-all diameter of the stud, so that the stud is spaced from one side of the bore and so that the jack may be placed over the stud by a rectilinear movement. A tight engagement between the stud and the jack is secured by means of the steel ball detent 66, which is pressed into the bores by the coil spring 67 housed by the spring barrel 68 carried by the jack. The ball 66 is partially pressed through the detent aperture 69, the axis 70 of which is perpendicular to the axis 71 of the bore 62 and is also perpendicular to the axis of the bore 63 which intersects the axis of the bore 71 at the point 72, through which point the line 70 also passes. Regardless therefore of which bore the stud is received in, the detent presses the stud against the inner face 73a of the wall 73 which is unapertured and which is common to both the bores 62 and 63 and the threads of the stud are thus caused to securely but yieldingly interengage with either the threads 64 or the threads 65, as the case may be. The ball 66 and coil spring 67 are desirably self-centering with respect to the aperture 69 and the axis 70 which is not always possible with the detents pressed by a leaf spring.

As best shown in Figure 17, the threads 64 and 65 are right-hand threads to mate with the customary right-hand threads of the stud 2 and the threads 64 and 65 being transversely related but not overlapping, as here shown, tend to converge at a point 74 which is substantially the center of the inner surface 73a of the wall 73 and is also substantially directly in line with the line 70 in the direction of which the detent 66 is pressed. Thus whether the stud is received in the bore 62 or the bore 63, it is pressed squarely against the wall 73a, so that its threads are pressed squarely into intercalation with the threads 64 or 65, as the case may be, and in either event, it will find sufficient threads upon this wall extending in the proper direction to effect the secure but yielding engagement between the stud and jack heretofore described.

Having described my invention, I claim:

1. Connecting means including a hollow metallic jack having intersecting transversely related bores therein, an aperture communicating with each of said bores, a seat in said aperture, a ball on said seat, said seat permitting a portion of said ball to be projected therepast into said bores, and a spring arm carried by said jack extending axially of the jack upon the exterior thereof and pressing said ball upon its seat.

2. Connecting means including a hollow metallic jack having intersecting transversely related bores therein; an aperture communicating with each of said bores; a seat in said aperture; a ball on said seat; said seat permitting a portion of said ball to be projected therepast into said bores; and a spring arm carried exteriorly by said jack extending axially of the jack upon the exterior thereof and pressing said ball upon its seat, said arm having a seat therein for the ball, said seat being formed by the margins of a hole in said arm.

3. Connecting means comprising a hollow metallic jack having intersecting transversely related bores therein, one of said bores being coaxial with the jack and the walls of said bores being screw-threaded; an aperture in said jack communicating with each of said bores; a seat in said aperture; a ball on said seat, said seat permitting a portion of said ball to be projected therepast into said bores; and a spring arm carried by said jack and extending axially of said jack upon the exterior thereof, said arm pressing said ball upon said seat.

4. Connecting means comprising a hollow metallic jack having intersecting transversely related bores therein, one of said bores being coaxial with the jack and the walls of said bores being screw-threaded; an aperture in said jack communicating with each of said bores; a seat in said aperture; a ball on said seat, said seat permitting a portion of said ball to be projected therepast into said bores; and a spring arm carried by said jack and extending axially of said jack upon the exterior thereof, said arm pressing said ball upon said seat, said arm having a seat therein for the ball.

5. Connecting means comprising a hollow metallic jack having intersecting transversely related bores therein, one of said bores being coaxial with the jack and the walls of said bores being screw-threaded; an aperture in said jack communicating with each of said bores; a seat in said aperture; a ball on said seat, said seat permitting a portion of said ball to be projected therepast into said bores; and a spring arm carried by said jack and extending axially of said jack upon the exterior thereof, said arm pressing said ball upon said seat, said arm having a seat therein for the ball, said seat in the arm being formed by the margin of a hole in said arm.

6. A receptacle, for receiving and releasably holding a plug conductor terminal having a lateral surface depression, comprising: socket means, having a body provided with intersecting recesses for receiving the terminal in either of said recesses; each of said recesses having a wall portion constructed and arranged to engage in said lateral surface depression of the terminal; said body having an aperture communicating with said recesses; a ball in said aperture; said aperture being so constructed and arranged that it provides a seat for said ball and so that said seat permits a portion of said ball to be projected therepast into said recesses; and a spring arm, extending along said body on the exterior thereof, constructed and arranged to press said ball upon said seat.

HARRY A. DOUGLAS.